S. THRAILKILL.
Ditching Plow.
No. 4,751.  Patented Sept. 10, 1846.
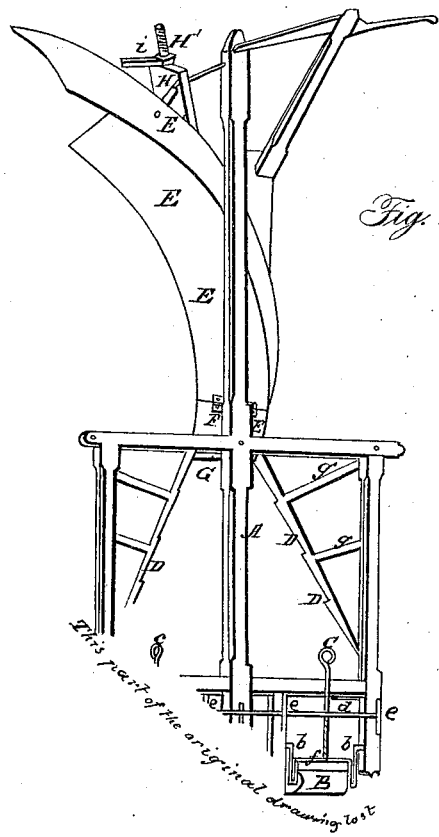
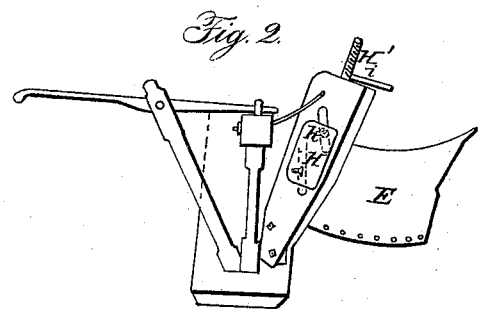
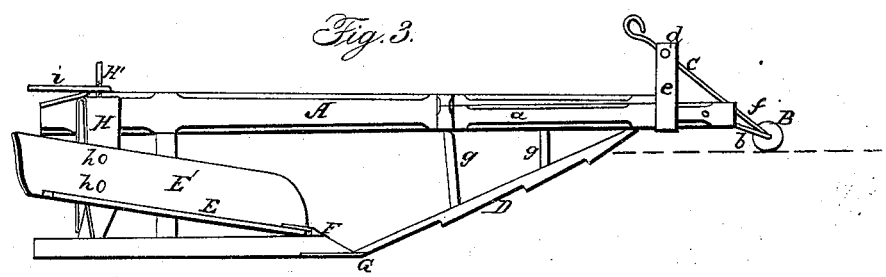

UNITED STATES PATENT OFFICE.

SAMUEL THRAILKILL, OF LA FAYETTE, INDIANA.

IMPROVEMENT IN DITCHING-MACHINES.

Specification forming part of Letters Patent No. 4,751, dated September 10, 1846.

*To all whom it may concern:*

Be it known that I, SAMUEL THRAILKILL, of La Fayette, in the county of Tippecanoe and State of Indiana, have invented new and useful Improvements in Machines for Excavating and Embanking Ditches; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a plan of the machine, taken partly in perspective; Fig. 2, a view of the back, and Fig. 3 a side elevation.

The same letters indicate like parts in all the figures.

My first improvement consists in connecting the mold-board or winding trough, which carries up the earth and delivers it on the side of the ditch to form the embankment, with the share by means of a hinge-joint, so that this part of the machine can be elevated or depressed to adapt it to the forming of any depth of ditch.

My second improvement consists in adapting to the forward part of the frame, which carries the forward end of the side cutters that form the sides of the ditch, two rollers or wheels, the axles of which are hung in vibrating frames, each connected by a stirrup with a screw that is tapped through an arbor that turns in standards, so that by the turning of the screws the rollers can be elevated or depressed at pleasure to increase or decrease the depth of the ditch.

My third improvement consists in making the cutting-edges of the two inclined side cutters with offsets or teeth to increase their capacity for cutting.

In the accompanying drawings, A represents the beam, to the forward end of which is connected a horizontal square frame, *a*. To the forward end of this frame is hung four vibrating arms, *b b b b*, in the lower ends of which turn the the axles of two rollers, B B, so that by the vibration of these arms the rollers are elevated or depressed to gage the depth of ditch, this being effected by means of the screws *c c*, that are tapped into the two shafts *d d*, that turn in the standards *e e e e*, the ends of the screws being swiveled to bridles *f f*, connected with the lower end of the vibrating arms, for it will be evident that the turning of the screws *c c* will cause the arms to vibrate, and therefore to elevate or depress the gage-rollers which run on the surface of the ground and act as gages to regulate the depth of cut of the machine.

The sides of the ditch are formed by the two side inclined cutters, D D, attached to the under side of the frame *a*, and to the forward part of the share G, which cuts the bottom of the ditch, and the cutters are further sustained by oblique braces *g g g g*. The cutting-edges are formed of four or more long teeth by notching in the cutting-edge, this mode of making the cutting-edge being better adapted to cutting roots, grass, &c., than if each cutter were formed of a continuous cutting-edge. The earth cut by the share (which is of the usual construction) and side cutters is carried up and delivered on the surface at the side of the ditch by means of a curved inclined board, E, called the "mold-board," to one side of which there is a curved flange, E', of sufficient height to force over the earth. The forward end of this mold-board is jointed to the back of the share by a hinge, F, and the back part is connected with a standard, H, by means of two bolts, *h h*, attached to the flange E', and passing through two slots in the standard, that the mold-board may be secured at any elevation desired by screw-nuts, to adapt the mold-board to any depth of ditch to which the front cutters may be set.

The standard is made hollow to receive a screw, H', which is connected with the screw-bolts *h h*, and provided with a nut, *i*, for the purpose of raising the mold-board, which in a large machine is of considerable weight.

By this arrangement of parts it will be obvious that the machine can be readily adapted to any desired depth of ditch, and that the earth cut out to form the embankment is never elevated to a greater height than is necessary in proportion to the depth of ditch to be cut. The hinge that forms the connection between the mold-board and share may be of any kind desired, provided it does not present obstructions on the surface, and the connection between the mold-board and standard may be made in any manner that will admit of the adjustment required, as pointed out above.

I claim—

In combination with the adjustable mold-board, adjusting the depth of the forward part of the machine substantially as described.

SAMUEL THRAILKILL.

Witnesses:
CYRUS JEFFRIES,
A. B. SLAUGHTER,
R. H. HATCHER.